United States Patent [19]
Ballard et al.

[11] Patent Number: 5,875,586
[45] Date of Patent: Mar. 2, 1999

[54] LIQUID BAIT STATION

[76] Inventors: James Bruce Ballard, 7 Chestnut Rd., Medford, N.J. 08055-3465; Elleen P. McGorman, 411 Shades of Death Rd., City of Great Meadows, N.J. 07838

[21] Appl. No.: 738,597

[22] Filed: Oct. 29, 1996

Related U.S. Application Data

[63] Continuation-in-part of Ser. No. 621,556, Mar. 25, 1996, Pat. No. 5,693,331.

[51] Int. Cl.$^6$ ........................................ A01M 1/20
[52] U.S. Cl. ............................................. 43/131
[58] Field of Search ...................... 43/131, 132.1, 43/121; 424/405, 406

[56] References Cited

U.S. PATENT DOCUMENTS

| | | | |
|---|---|---|---|
| 1,179,687 | 4/1916 | Veeder | 43/131 |
| 1,186,178 | 6/1916 | French | 43/131 |
| 1,769,408 | 7/1930 | Andrews | 43/131 |
| 1,887,771 | 11/1932 | Marsh | 43/131 |
| 1,916,982 | 7/1933 | Jones | 43/131 |
| 2,060,245 | 11/1936 | Rosefield | 43/131 |
| 2,157,953 | 5/1939 | De Long | 43/131 |
| 2,176,345 | 10/1939 | Hurwitt | 43/131 |
| 5,274,950 | 1/1994 | Roberts | 43/131 |
| 5,406,743 | 4/1995 | McSherry et al. | 43/107 |

*Primary Examiner*—Daniel D. Wasil
*Attorney, Agent, or Firm*—Michael Lee; I. Robert Silverman; Joseph Lucci

[57] ABSTRACT

The invention provides a method and apparatus dispensing a liquid bait in a refillable manner. The invention provides a transparent bait station in which is mounted to a structure. A liquid bait is injected into the bait station to initially fill and then refill the bait station. The bait is a slow acting toxicant and attractant. The bait station is formed to allow access by bugs, but not by larger animals. The bait station is also able to protect the bait from wind and rain. The bait station prevents leakage of the toxicant if the bait station is tumbled or placed in an incorrect position. The bait station is able to hold two different liquid baits, which may be two different poisons, or a poison and an attractant. An embodiment of the bait station provides a series of inner walls to minimize the leakage of liquid bait, if the liquid bait station is tumbled.

19 Claims, 6 Drawing Sheets

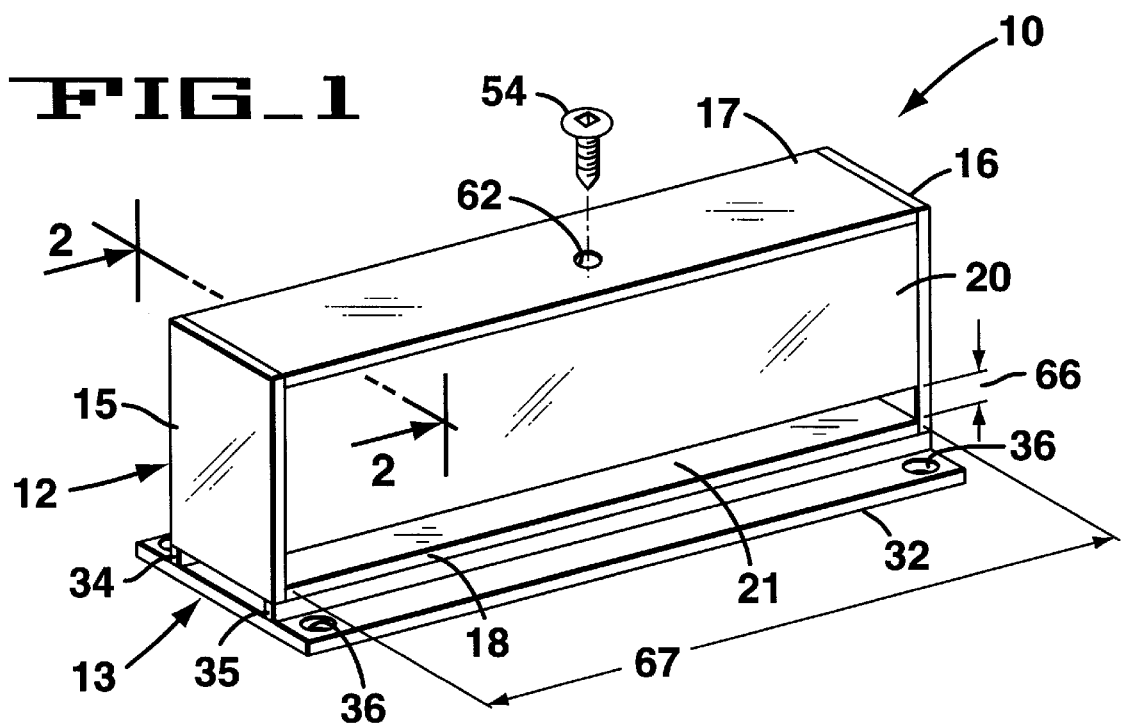
FIG_1
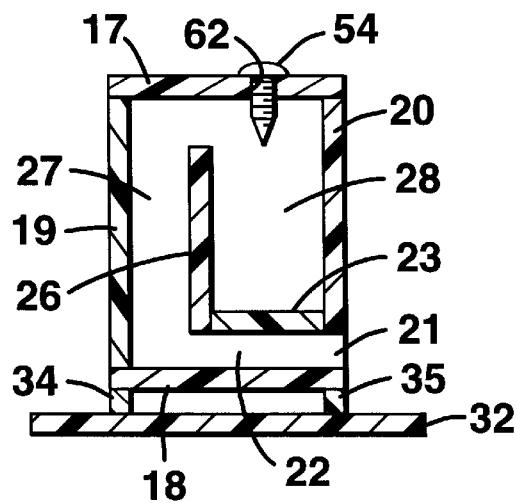
FIG_2
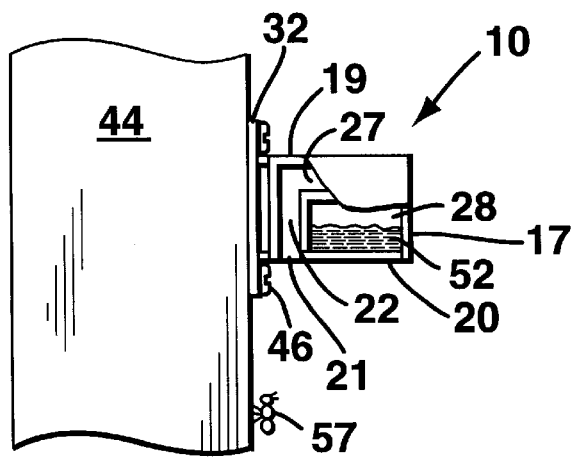
FIG_3

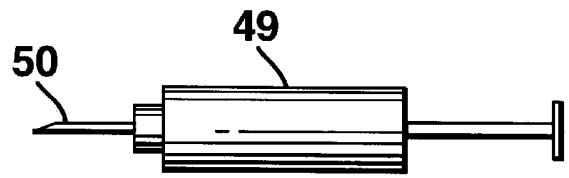
FIG_4
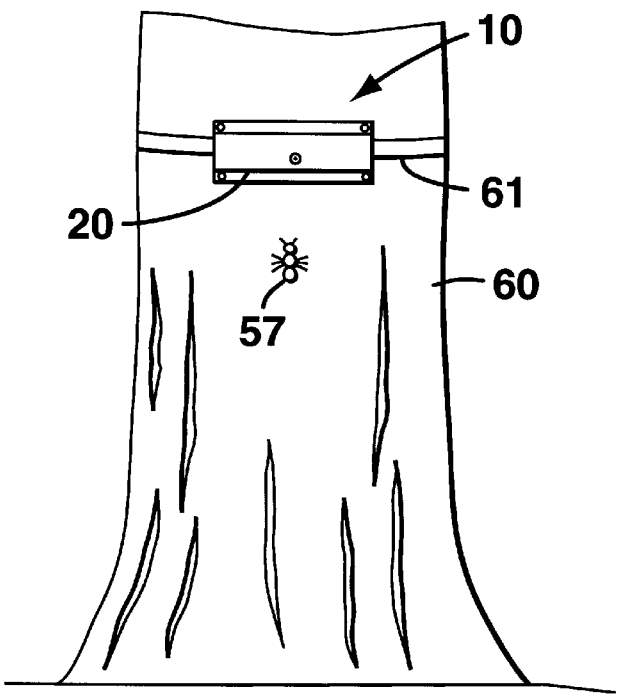
FIG_5
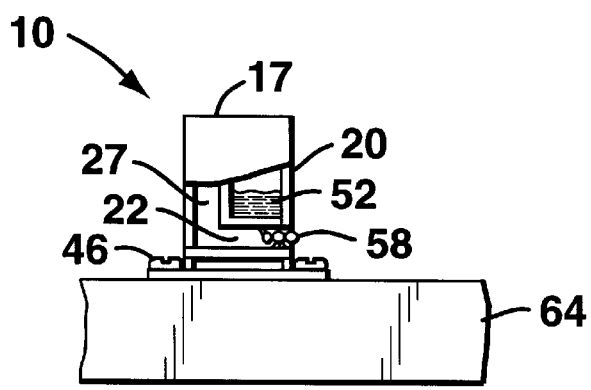
FIG_6

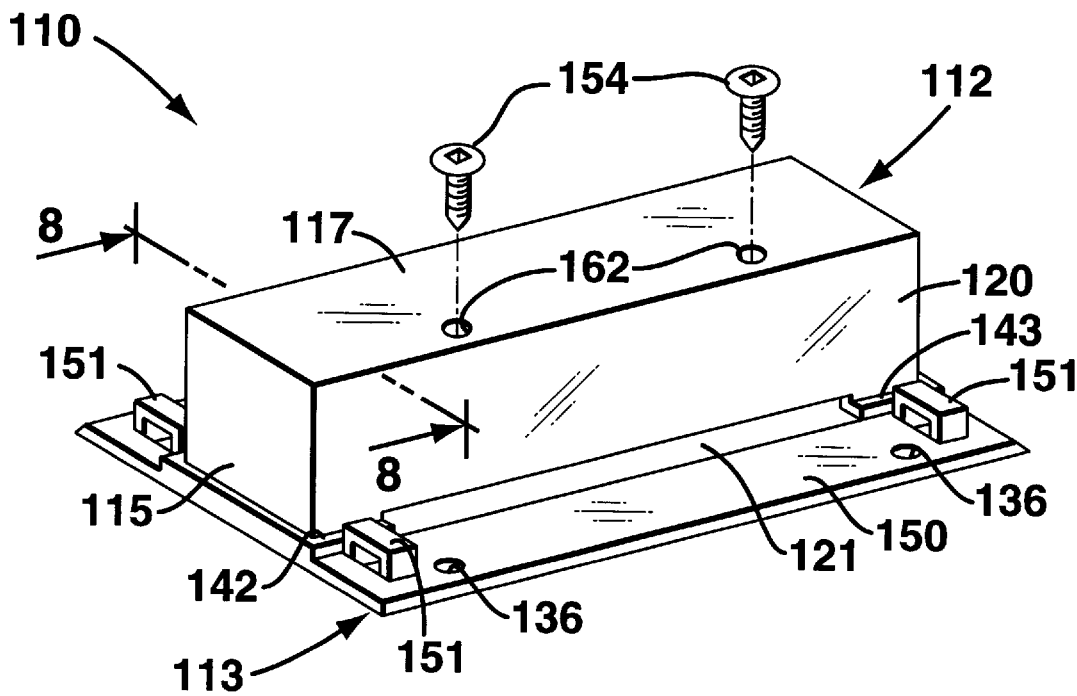
FIG_7
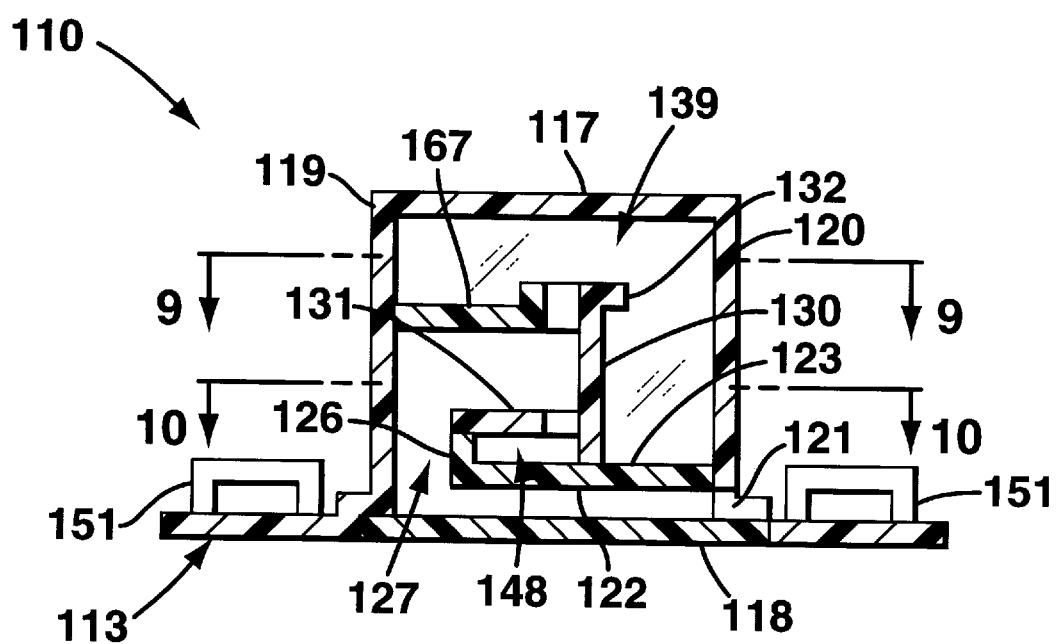
FIG_8

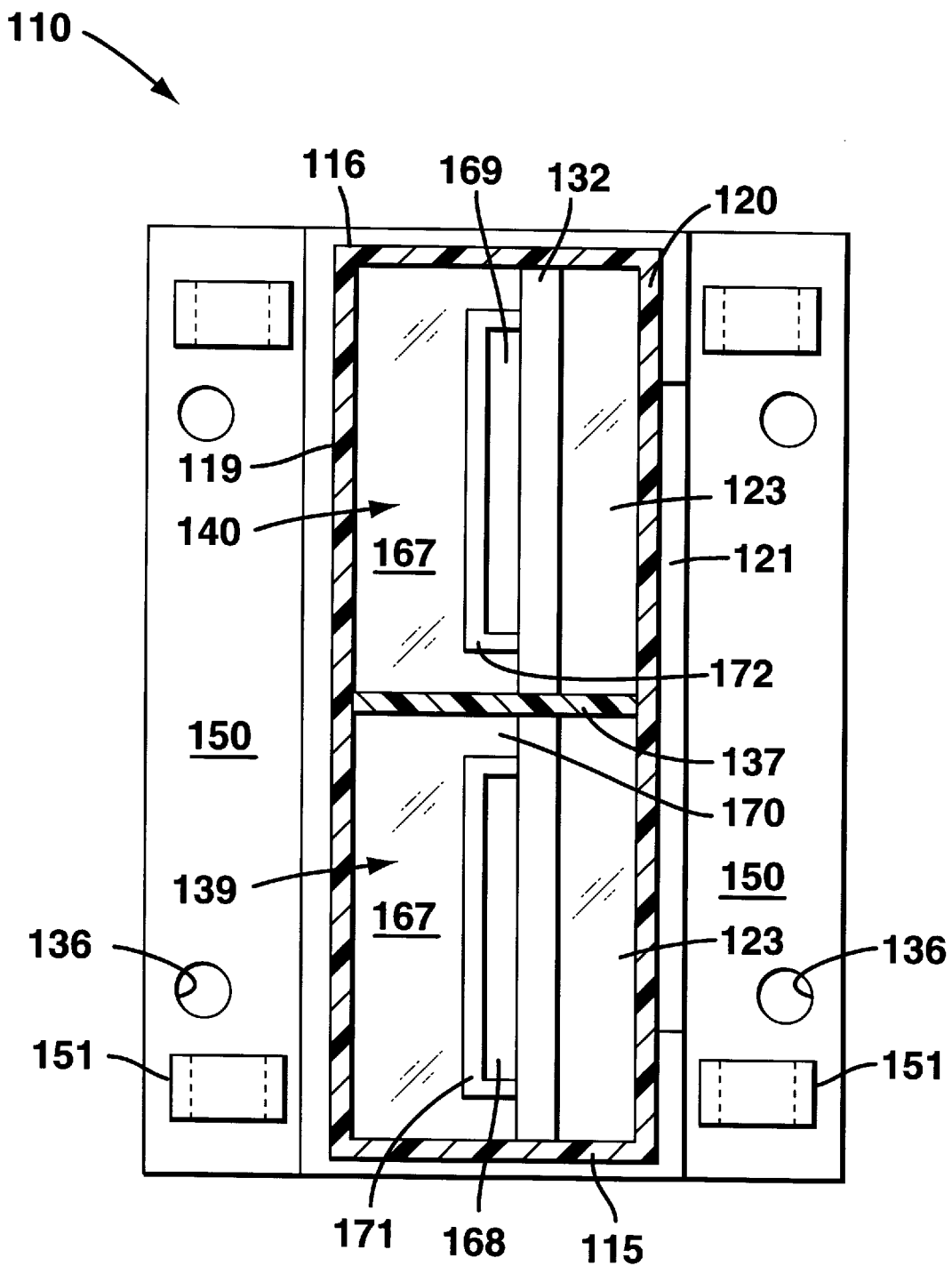
FIG_9

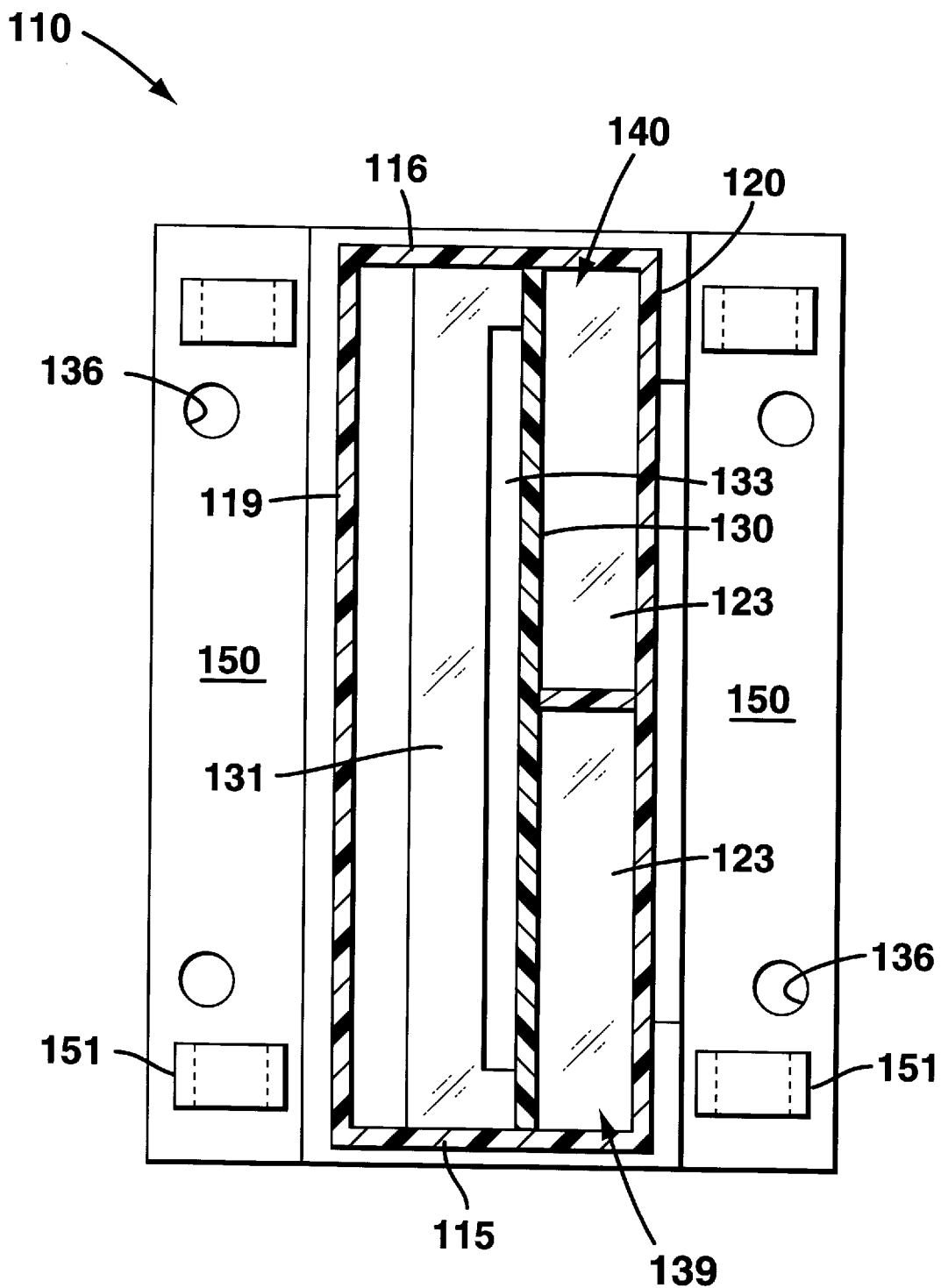
FIG_10

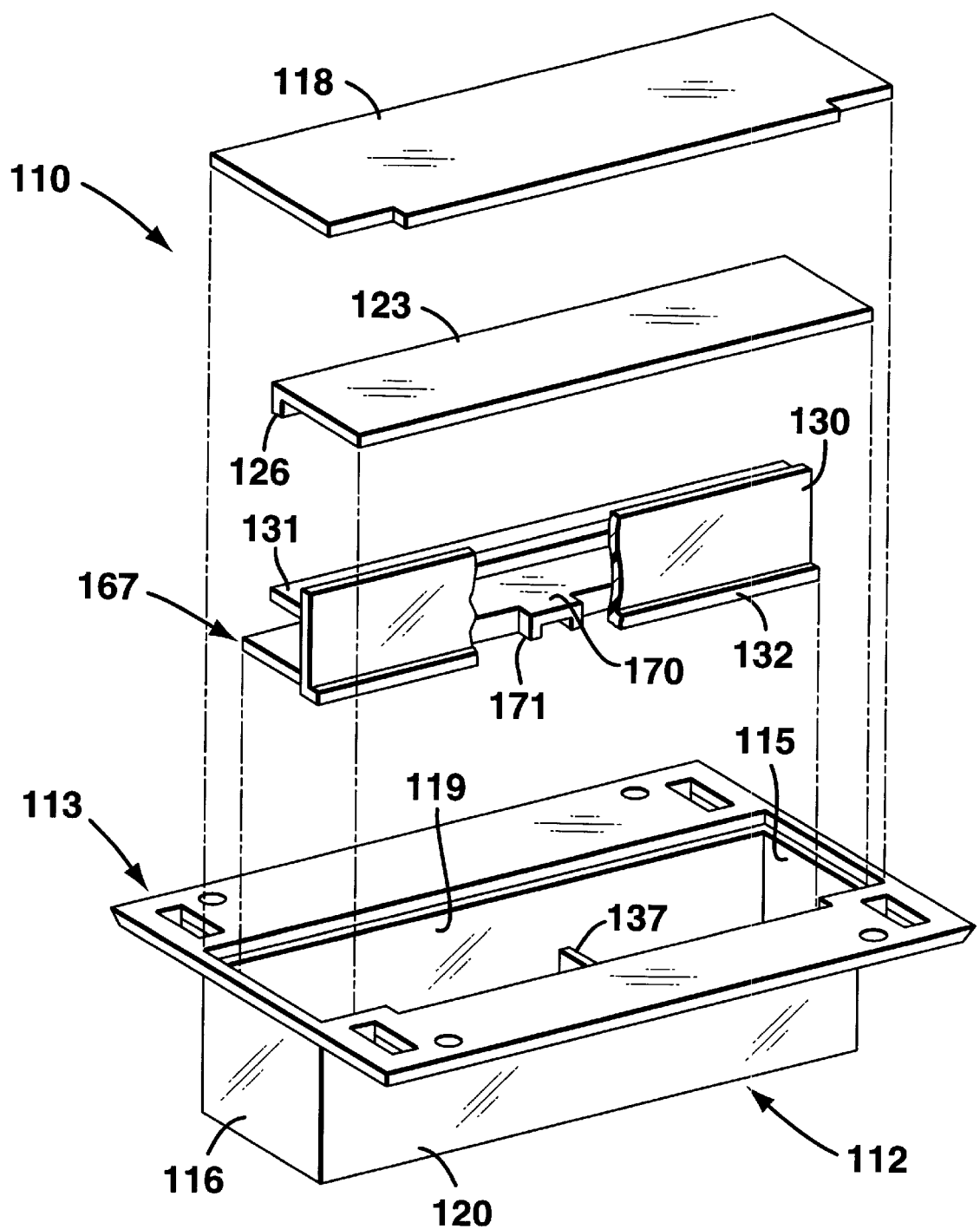
FIG_11

LIQUID BAIT STATION

This is a continuation-in-part of application Ser. No. 08/621,556, filed Mar. 25, 1996, now U.S. Pat. No. 5,693,331.

BACKGROUND OF THE INVENTION

The present invention relates generally a bait station which is able to hold a liquid bait.

Ants belonging to species of Camponotus, commonly known as carpenter ants, are an important economic pest. They cause structural damage to homes, telephone poles, and trees by tunneling into the wood. Methods to control carpenter ants have been evaluated based on effectiveness against the ants, environmental safety and ease of use, especially for pest control operators (PCO's) concerned with ant population management. Carpenter ants have been controlled in the field by use of sprays or dusts, methods that are considered by many to be environmentally unfriendly. Furthermore, exposure of the spray or dust to environmental elements can limit the effectiveness of the toxicant, for example, by rain washing it away. Spray or dust applications kills ants, but usually does not eliminate a colony, unless the colony is directly sprayed or dusted, which often requires locating the colony. A "cleaner," more effective method of control is to place a toxic bait in an ant station so as to prevent exposure to non-target organisms, such as children and pets, and to shield the bait from environmental factors that may cause degradation and dilution of the toxicant. In addition, baits do not require locating the colony. Typically, when such solid baits have been depleted, the entire self-contained station must be replaced. Preferred toxicants are ones that are slow enough acting to allow the ant time to bring it back to the nest and thereby deliver the toxicant to the rest of the colony. There is a need for such bait stations for carpenter ants.

SUMMARY OF THE INVENTION

It is an object of the invention to provide a refillable bait station for holding a liquid bait.

It is another object of the invention to provide an apparatus and method for eliminating social insects in the ground.

The invention provides a method and apparatus for dispensing a liquid bait in a refillable manner.

BRIEF DESCRIPTION OF THE DRAWINGS

FIG. 1 is a perspective view of a preferred embodiment of the inventive bait station.

FIG. 2 is a cross sectional view of the bait station shown in FIG. 1 along line 2—2.

FIG. 3 is a cut away view of the bait station mounted on a vertical surface of a structure such as a house.

FIG. 4 is a view of a syringe used to inject bait into a bait station.

FIG. 5 is a view of a bait station mounted on a structure such as a tree.

FIG. 6 is a view of a bait station mounted on a horizontal surface of a structure.

FIG. 7 is a perspective view of another preferred embodiment of the inventive bait station.

FIG. 8 is side view of the bait station shown in FIG. 7.

FIG. 9 is a cross-sectional view of the bait station shown in FIG. 8, along line 9—9.

FIG. 10 is a cross-cross sectional view of the bait station shown in FIG. 8, along line 10—10.

FIG. 11 is an exploded view of the bait station shown in FIG. 7.

DESCRIPTION OF THE PREFERRED EMBODIMENTS

FIG. 1 is a perspective view of a preferred embodiment of the inventive bait station 10. FIG. 2 is a cross sectional view of the bait station 10 shown in FIG. 1 along line 2—2. The bait station 10 comprises a slotted enclosure 12 mechanically connected to a mounting means 13. The enclosure 12 is in the form of a rectangular box with a first end wall 15, a second end wall 16, a first side wall 17, a second side wall 18, a top wall 19, and a bottom wall 20. The first end wall 15 is spaced apart from the second end wall 16. The first side wall 17 and the second side wall and the top wall 19 and the bottom wall 20 each extend from the first end wall 15 to the second end wall 16. The top wall 19 also extends from the first side wall 17 to the second side wall 18. The bottom wall 20 also extends from the first side wall 17 to a slot 21, where the bottom wall 20 forms one side of the slot 21 and the second side wall 18 forms another side of the slot 21 and where the slot 21 extends from the first end wall 15 to the second end wall 16. The second side wall 18 forms one side of a first passageway 22 leading from the slot 21. A first inner wall 23 forms a second side of the first passageway 22, with both the first inner wall 23 and the first passageway 22 extending from the first end wall 15 to the second end wall 16 and wherein the first inner wall 23 is parallel to the second side wall 18. A second inner wall 26 is placed at an end of the first inner wall 23 parallel to the top wall 19, so that a second passageway 27 is formed which extends between the top wall 19, the second inner wall 26, the first end wall 15 and the second end wall 16 and is connected to the first passageway 22. A chamber 28 is formed between the first end wall 15, the second end wall 16, the bottom wall 20, the first inner wall 23 and the second inner wall 26 and which is connected to the second passageway 27. The first end wall 15, second end wall 16, first side wall 17, second side wall 18, top wall 19, bottom wall 20, first inner wall 23, and second inner wall 27 are all made of a transparent plastic. A filling hole 62 passes through the first side wall 17. A sealing screw 54 is provided for sealing the filling hole 62.

In the preferred embodiment, the slot 21 has a width 66 of ⅛ of an inch and a length 67 of 3 inches, which is approximately equal to the length of the bait station 10. It is preferable that the width 66 of the slot 21 be less than ¼ of an inch but greater than ¹⁄₃₂ of an inch. The goal is to have a width that is wide enough to allow access by the target pest, but narrow enough to prevent access by certain non-target animals. The length 67 of the slot 21 may be several times larger than the width to provide a large area of access by the target pest and may have a range of between 1 inch to 10 inches.

The mounting means 13 comprises a plate 32 mounted to the slotted enclosure 12 by a first mounting strip 34 and a second mounting strip 35 mechanically connected by an adhesive between the plate 32 and the slotted enclosure 12. The plate 32 has a plurality of screw holes 36 for mounting the station 10 on the wall of a house or on a tree.

In operation, the bait station 10 is mounted to the wall 44 of a structure such as a house, as illustrated in FIG. 3. Mounting screws 46, passing through the screw holes 36 of the plate 32 (FIG. 1) mechanically connect the bait station 10 to the wall 44. The bait station 10 is positioned so that the bottom wall 20 is vertically the lowest part of the slotted enclosure 12. A liquid bait is placed in a syringe (FIG. 4). The tip 50 of the syringe 49 is placed in the filling hole 62 and the liquid bait is injected into the bait station 10, where the liquid bait 52 has an upper surface. The syringe 49 is removed from the filling hole 62 and the sealing screw 54 is placed in the filling hole 62.

Liquid baits include the range of liquids from a low viscosity liquid to a high viscosity liquid in a colloidal system such as a gel. Such liquid baits have an attractant to entice ants or other insects and a slow acting toxicant to kill the ants or other insects.

An ant 57, such as a carpenter ant, crawls up the wall 44 onto the plate 32, through the slot 21 into the first passageway 22, and then into the second passageway 27, into the chamber 28 to the upper surface of the liquid bait 52. The ant 57 takes some of the liquid bait and returns to the ant colony, where the bait is distributed. The slow acting toxicant kills the ant and several other ants which also feed on the slow acting toxicant in the colony.

The transparent sides of the bait station 10 are used to view the liquid bait. When the liquid bait is diminished, the sealing screw 54 is removed from the filling hole 62 and the syringe 49 is used to inject more liquid bait into the bait station 10.

The bait station 10 protects the liquid bait 52 from exposure to wind and rain. The bait station 10 prevents leakage of the liquid bait 52, which otherwise could expose the toxicants to animals.

FIG. 5 illustrates a bait station 10 mechanically connected to a vertical surface of a structure such as a tree 60 by a plastic strap 61. The plastic strap passes between the plate 32, the first side wall 18, the first mounting strip 34 and the second mounting strip 35 (FIG. 2). The bait station 10 is mounted so that the bottom wall 20 is vertically the lowest part of the slotted enclosure 12.

FIG. 6 illustrates a bait station 10 mounted on a horizontal surface of a structure 64 such as a house. The mounting screws 46 are used to mechanically connect the bait station 10 to the structure 64. An ant 58 is shown partly in the slot 21 (FIG. 2) and partly in the first passage 22. The ant 58 crawls from the first passage 22 to the second passage 27 and to the liquid bait 52. The ant 58 takes the liquid bait 58 to the ant's colony.

As used in the specification and claims means for mechanically connecting the bait station to a structure may be by screws, plastic straps, adhesives, nails or other means.

FIG. 7 is a perspective view of a preferred embodiment of the inventive bait station 110. FIG. 8 is side view of the bait station 110 shown in FIG. 7. FIG. 9 is a cross-sectional view of the bait station 110 shown in FIG. 8, along line 9—9. FIG. 10 is a cross-cross sectional view of the bait station 110 shown in FIG. 8, along line 10—10. FIG. 11 is an exploded view of the bait station 110.

The bait station 110 comprises a slotted enclosure 112 mechanically connected to a mounting means 113. The enclosure 112 is in the form of a rectangular box with a first end wall 115, a second end wall 116, a first side wall 117, a second side wall 118, a top wall 119, and a bottom wall 120. The first end wall 115 is spaced apart from the second end wall 116. The first side wall 117, the second side wall 118, the top wall 119, and the bottom wall 120 each extend from the first end wall 115 to the second end wall 116 and are mechanically connected to the first end wall 115 and the second end wall 116. The top wall 119 also extends from the first side wall 117 to the second side wall 118, and is mechanically connected to the first side wall 117 and the second side wall 118. The bottom wall 120 also extends from the first side wall 117 to the second side wall, with a slot 121 between a portion of where the bottom wall 120 meets the second side wall 118. In the preferred embodiment, the mechanical connection between the mounting means 113, the first end wall 115, second end wall 116, first side wall 117, top wall 119, and bottom wall 120 as mentioned above are accomplished by forming the mounting means 113, the first end wall 115, second end wall 116, first side wall 117, top wall 119, and bottom wall 120 out of a single molded piece of plastic, as shown in FIG. 11. An adhesive is used to mechanically connect the second side wall 118 to the top wall 119, bottom wall 120, first end wall 115, and second end wall 116 to form the slotted enclosure 112.

The second side wall 118 forms one side of a first passageway 122 leading from the slot 121. A first inner wall 123 forms a second side of the first passageway 122, with both the first inner wall 123 and the first passageway 122 extending from the first end wall 115 to the second end wall 116 and from the bottom wall 120 and wherein the first inner wall 123 is parallel to the second side wall 118. A second inner wall 126 forming a lip on the first inner wall 123 is placed at an end of the first inner wall 123 on an edge away from the bottom wall 120, and parallel to the top wall 119, so that a second passageway 127 is formed which extends between the top wall 119, the second inner wall 126, the first end wall 115 and the second end wall 116 and is connected to the first passageway 122. The first inner wall 123 and the second inner wall 126 are mechanically connected together by molding the first inner wall 123 and the second inner wall 126 out of a single piece of plastic.

A third inner wall 130 is mechanically connected to and perpendicular to the first inner wall 123, extending from the first end wall 115 to the second end wall 116. A third inner wall lip 132 is formed on an edge of the third inner wall 130 furthest away from the first inner wall 123, extending from the first end wall 115 to the second end wall 116. A fourth inner wall 131 is mechanically connected to the third inner wall 130, and parallel to the first inner wall 123. The fourth inner wall extends from the third inner wall 130 to the second inner wall 126, and from the first end wall 115 to the second end wall 116. A fourth inner wall slot 133 extends partly along the edge of the fourth inner wall 131, where the fourth inner wall 131 is mechanically connected to the third inner wall 130.

A fifth inner wall 167 is mechanically connected to the third inner wall 130, and parallel to the first inner wall 123, extending from the first end wall 115 to the second end wall 116. A divider wall 137 is placed parallel to the first end wall 115 between the first end wall 115 and the second end wall 116, wherein the divider wall 137 extends from the top wall 119 to the bottom wall 120 and to the first inner wall 123, the third inner wall 130, the fifth inner wall 167 and the third inner wall lip 132. The fifth inner wall 167 has a first slot 168 and a second slot 169, where the fifth inner wall 167 is mechanically connected to the third inner wall 130. The first slot 168 is on a first side of the divider wall 137, and the second slot 169 is on a second side of the divider wall 137, with a tongue 170 dividing the first slot 168 from the second slot 169. A first slot lip 171 is on three sides of the first slot 168, and is mechanically connected to the fifth inner wall 167. A second slot lip 172 is on three sides of the second slot 169, and is mechanically connected to the fifth inner wall 167. In this embodiment, the third inner wall 130, the third inner wall lip 132, the fourth inner wall 131, the fifth inner wall 167, the first slot lip 171, and the second slot lip 172 are mechanically connected by forming these parts from a single molded piece of plastic, as shown in FIG. 11. The third inner wall 130 is mechanically connected to the first inner wall 123 by an adhesive.

A first chamber 139 is formed between the first end wall 115, the divider wall 137, the top wall 119, the bottom wall 120, the first inner wall 123, the third inner wall 130, and the first side wall 117. A second chamber 140 is formed between the second end wall 116, the divider wall 137, the top wall 119, the bottom wall 120, the first inner wall 123, the third inner wall 130, and the first side wall 117. A catch chamber 148 is formed between the first inner wall 123, the second inner wall 126, the third inner wall 130, and the fourth inner wall 131.

A first outer baffle 142 extends from the first end wall 115 to a side of the slot 121, and from the bottom wall 120 to the second side wall 118. The first outer baffle 142 makes the slot 121 shorter and in this embodiment forms an integral part of the bottom wall 120. A second outer baffle 143 extends from the second end wall 116 to a side of the slot 121, and from the bottom wall 120 to the second side wall 118. The second outer baffle 143 makes the slot 121 shorter and in this embodiment forms an integral part of the bottom wall 120.

The first end wall 115, second end wall 116, first side wall 117, second side wall 118, top wall 119, bottom wall 120 are all made of a transparent plastic. Filling holes 162 passes through the first side wall 117. Sealing screws 154 are provided for sealing the filling holes 162.

The slot 21 has a width of ⅛ of an inch and a length of 2 inches. The length of the bait station 110 is 3 inches. It is preferable that the width of the slot 21 be less than ¼ of an inch but greater than 1/32 of an inch. The goal is to have a width that is wide enough to allow access by the target pest, but narrow enough to prevent access by certain non-target animals. The length of the slot 121 may be several times larger than the width to provide a large area of access by the target pest and may have a range of between 1 inch to 10 inches.

The mounting means 113 comprises a mounting plate 150 with a plurality of screw holes 136 for mounting the station 110 on the wall of a house or on a tree. The mounting means 113 also has a plurality of strap loops 151. Straps may be placed through the strap loops 151 to mount the liquid bait station 110 to a tree.

In operation, the bait station 110 is mounted to the wall of a structure such as a house or to a tree or some other object. A liquid bait is placed in a syringe (FIG. 4). The tip 50 of the syringe 49, as shown in FIG. 4 is placed in the filling hole 162 and the liquid bait is injected into the bait station 110. The syringe 49 is removed from the filling hole 162 and the sealing screw 154 is placed in the filling hole 162. Separate filling holes 162 are used to fill the first chamber 139 and the second chamber 140. The first chamber 139 and the second chamber 140 may have the same liquid bait. It may also be desirable to put one kind of liquid bait in the first chamber 139 and another kind of liquid bait 140 in the second chamber 140 so that the bait station 110 could be used for two different pests. In another use, a toxicant could be placed in the first chamber 139 and an attractant could be placed in the second chamber 140.

Once a liquid bait is placed in the bait station 110, if the station 110 is removed from its mounting place and slowly tumbled, the third inner wall lip 132, the first slot lip 171 and the second slot lip 172 reduce the amount of liquid that is able to flow through the first slot 168 and second slot 169 of the fifth inner wall 167. If the bait station 110 is placed on its side, the fact that the first slot 168 and the second slot 169 of the fifth inner wall 167 do not extend all the way to the first end wall 115, the second end wall 116, or the divider wall 137 will keep the liquid bait from passing through either the first slot 168 or the second slot 169 of the fifth inner wall 167. Most of the small amount of liquid bait that may pass through the first slot 168 or the second slot 169 of the fifth inner wall 167, will pass through the fourth inner wall slot 133 to the catch chamber 148. This further reduces the amount of liquid bait that may pass to the outside of the liquid bait station 110, if the liquid bait station 110 is tumbled. The first outer baffle 142 and the second outer baffle 143 further reduce the amount of liquid bait that will flow to the outside of the liquid bait station 110 if the liquid bait station 110 is placed on its side. Preventing liquid bait from passing to the outside of the bait station 110 makes the bait station 110 safer by reducing the risk of poisoning. This is an improvement over the bait station 10 shown in FIG. 1, which is more likely to leak liquid bait if the bait station 10 is tumbled or placed sideways.

The edges of the mounting plate 150 are beveled to allow ants easier access to the liquid bait station 110.

Other embodiments of the invention may provide a longer station, such as one 9 inches long. The bait stations may be designed for other arthropod pests such as roaches, yellow jackets, earwigs, sow bugs, crickets, silverfish, and firebrats. The walls may be tinted other colors, such as yellow to attract yellow jackets.

While preferred embodiments of the present invention have been shown and described herein, it will be appreciated that various changes and modifications may be made therein without departing from the spirit of the invention as defined by the scope of the appended claims.

What is claimed is:

1. A bait station for dispensing a liquid bait, comprising:
   a slotted enclosure with a slot and wherein at least part of the slotted enclosure is made of a transparent material;
   a passageway within the slotted enclosure
   a first chamber with a first chamber slot within the slotted enclosure, for holding liquid bait, wherein the first chamber slot passes from the first chamber to the passage way;
   a catch chamber within the slotted enclosure for catching liquid bait that passes through the first chamber slot; and
   a filling hole passing through the enclosure to the chamber; and
   means for sealing the filling hole.

2. The bait station, as recited in claim 1, further comprising lips on sides of the first chamber slot.

3. The bait station, as recited in claim 1, further comprising a means for mounting the slotted enclosure to a structure.

4. The bait station, as recited in claim 3, further comprising lips on sides of the first chamber slot.

5. A bait station, for dispensing liquid bait, comprising:
   an enclosure with an aperture;
   a first inner chamber within the enclosure;
   a passageway between the aperture and the chamber; and
   means for impeding the liquid bait from flowing from the first inner chamber to the aperture, when the bait station is tumbled, wherein said means for impeding liquid bait from flowing from the first inner chamber comprises:
   a first slot in the first inner chamber; and
   a first lip on the sides of the first slot.

6. The bait station, as recited in claim 5, further comprising:
   a filling hole passing through the enclosure to the chamber; and
   means for sealing the filling hole.

7. The bait station, as recited in claim 6, further comprising a means for mounting the enclosure to a structure.

8. The bait station, as recited in claim 5, wherein the means for impeding liquid bait from flowing from the first inner chamber to the aperture, further comprises, a catch chamber, for catching liquid bait which flows from the first slot in the first inner chamber.

9. The bait station, as recited in claim 5, further comprising a second inner chamber within the enclosure.

10. The bait station, as recited in claim 9, further comprising means for impeding liquid bait from flowing from the second inner chamber.

11. A bait station for dispensing a bait, comprising:
   a slotted enclosure with a slot and wherein at least part of the slotted enclosure is made of a transparent material;
   a first inner wall within the slotted enclosure and forming a first passageway from the slot of the slotted enclosure and a part of a chamber, wherein the first passageway and the chamber are within the slotted enclosure;
   a second inner wall mechanically connected to the first inner wall, forming a second passage way connected to the first passage way, and wherein the second inner wall and the second passage way are within the slotted enclosure;
   a third inner wall mechanically connected to the first inner wall, forming part of the chamber;
   a fourth inner wall with a width and length mechanically connected to the third inner wall, wherein the fourth inner wall has a slot along part of the length of the fourth inner wall;
   a filling hole passing through the enclosure to the chamber;
   means for sealing the filling hole; and
   a means for mounting the slotted enclosure to a structure.

12. The bait station, as claimed in claim 11, wherein the slotted enclosure, comprises:
   a first end wall;
   a second end wall spaced apart from the first end wall;
   a first side wall extending from the first end wall and to the second end wall;
   a second side wall extending from the first end wall to the second end wall;
   a top wall extending from the first end wall to the second end wall and from the first side wall to the second side wall; and
   a bottom wall extending from the first end wall to the second end wall and from the first side wall to the slot, wherein the slot is adjacent to the bottom wall.

13. The apparatus, as claimed in claim 12, wherein the first inner wall extends from the bottom wall into the slotted enclosure, and from the first end wall to the second end wall, and wherein the second inner wall extends from the first end wall to the second end wall and is parallel to the top wall, and wherein the third inner wall extends from the first end wall to the second end wall and is parallel to the top wall and is placed between the second inner wall and the bottom wall.

14. The apparatus, as claimed in claim 13, further comprising a fifth inner wall mechanically connected to the third inner wall, wherein the fifth inner wall extends from the first end wall to the second end wall and is parallel to the first inner wall and has a first slot extending partially between the first end wall and the second end wall, and wherein the fourth inner wall extends between the first end wall and the second end wall and is parallel to the first inner wall and is located between the fifth inner wall and the first inner wall.

15. The apparatus, as claimed in claim 14, further comprising:
   a divider wall mechanically connected to the first inner wall, the third inner wall, the first side wall, and the bottom wall, and spaced apart from the first end wall and the second end wall and is located so that the first slot of the of the fifth inner wall is located on a first side of the divider wall;
   a second slot in the first inner wall on a second side of the divider wall.

16. The apparatus, as claimed in claim 15, further comprising:
   a first slot lip on sides of the first slot of the fifth inner wall; and
   a second slot lip on sides of the second slot of the fifth inner wall.

17. The apparatus, as claimed in claim 16, further comprising:
   a first outer baffle between the first end wall and the slot; and
   a second outer baffle between the second end wall and a side of the slot opposite from the first outer baffle.

18. The apparatus, as claimed in claim 17, wherein the means for mounting, comprises:
   a plate connected to the slotted enclosure, wherein the plate has a plurality of screw holes; and
   means for attaching a plastic strap to the plate.

19. The bait station, as recited in claim 10, wherein the means for impeding liquid bait from flowing from the second inner chamber comprises:
   a second slot in the second inner chamber; and
   a second lip on the sides of the second slot.

* * * * *